United States Patent [19]

Edwards

[11] 3,739,997

[45] June 19, 1973

[54] SQUARE PATTERN STRIP WINDING MEANS

[75] Inventor: Paul R. Edwards, Redondo Beach, Calif.

[73] Assignee: Edwards Enterprises of Orlando Inc., Orlando, Fla.

[22] Filed: Nov. 17, 1971

[21] Appl. No.: 199,655

[52] U.S. Cl. ............................... 242/67.1 R, 47/56
[51] Int. Cl. ............................................. B65h 17/06
[58] Field of Search ..................... 242/67.1, 67.3 R, 242/75.51, 81, 83, DIG. 3; 47/1.2, 56

[56] References Cited
UNITED STATES PATENTS

| 3,492,786 | 2/1970 | Roths | 242/67.1 R |
| 3,305,968 | 2/1967 | Dosedla | 47/1.2 |
| 3,209,492 | 10/1965 | Brardt | 47/16 |

*Primary Examiner*—George F. Mautz
*Assistant Examiner*—Edward J. McCarthy
*Attorney*—James E. Bryan

[57] ABSTRACT

A winding machine for winding strips of plant growth material in a square pattern on a pallet which includes a rotatable pallet means; a corner forming means comprising a cruciform support means removably mounted on the pallet means to rotate therewith, spaced above the pallet means and having its arms spanning the pallet means, a plurality of corner form means slidably mounted on the support means and spaced along the arms of the support means to form square patterns, of progressively larger size, of groups of four of the form means from complementary ones of the form means of each of the arms of the support means, and means for sliding the form means toward the pallet means; and drive means for rotating the pallet means and the support means. Where a strip of plant growth material is to be transferred from a full pallet to an empty pallet, the full pallet is mounted on a pallet drive means adjacent the winding machine and a guide means and speed regulating means is placed adjacent the two pallets to guide the strip of plant growth material as it passes from one pallet to the other and adjust the speed of the drive means of at least one of the pallets to compensate for variations in the size of the winding of strip material on the respective pallets as well as other variations in the speed of travel of the strip material.

21 Claims, 9 Drawing Figures

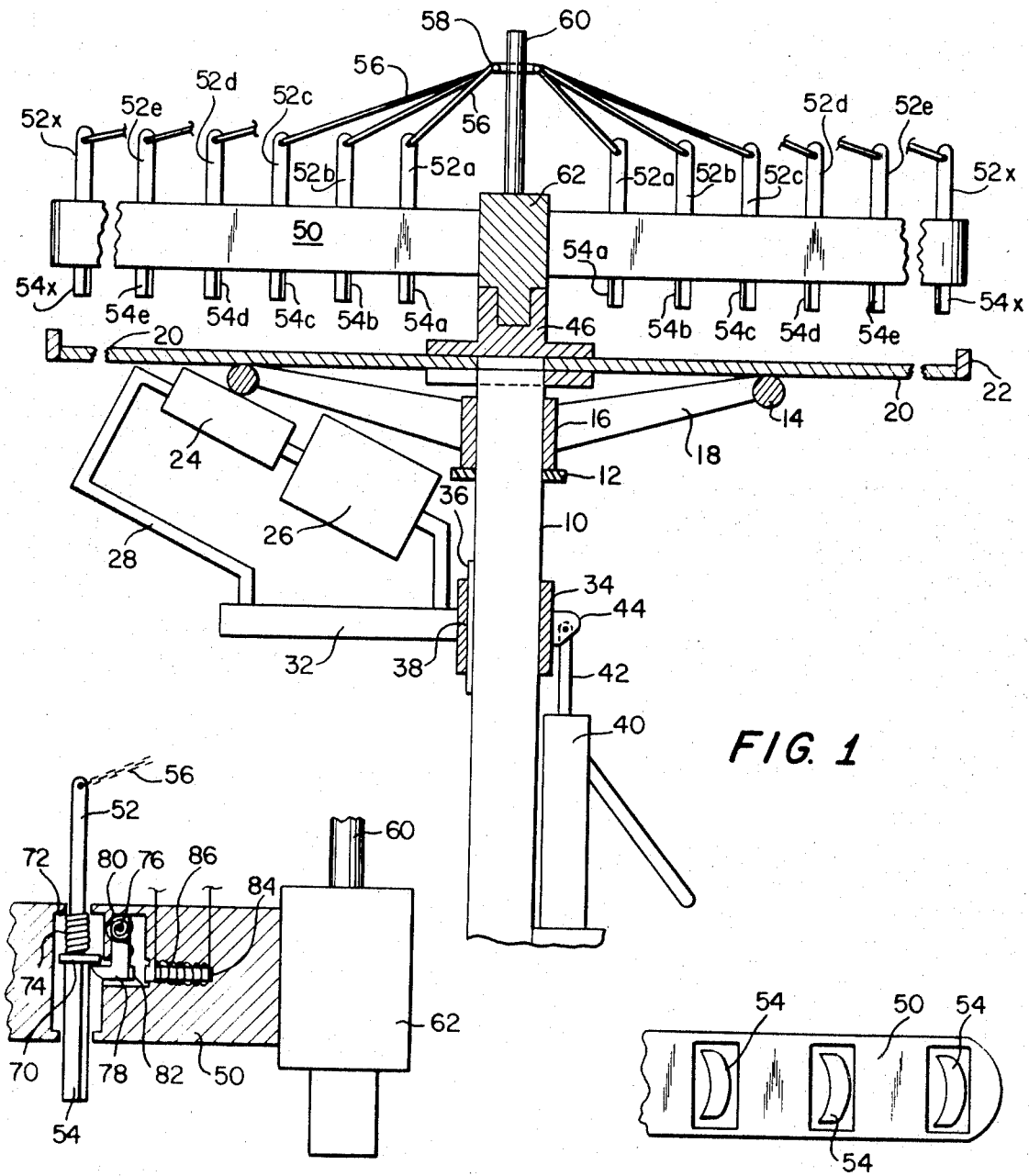

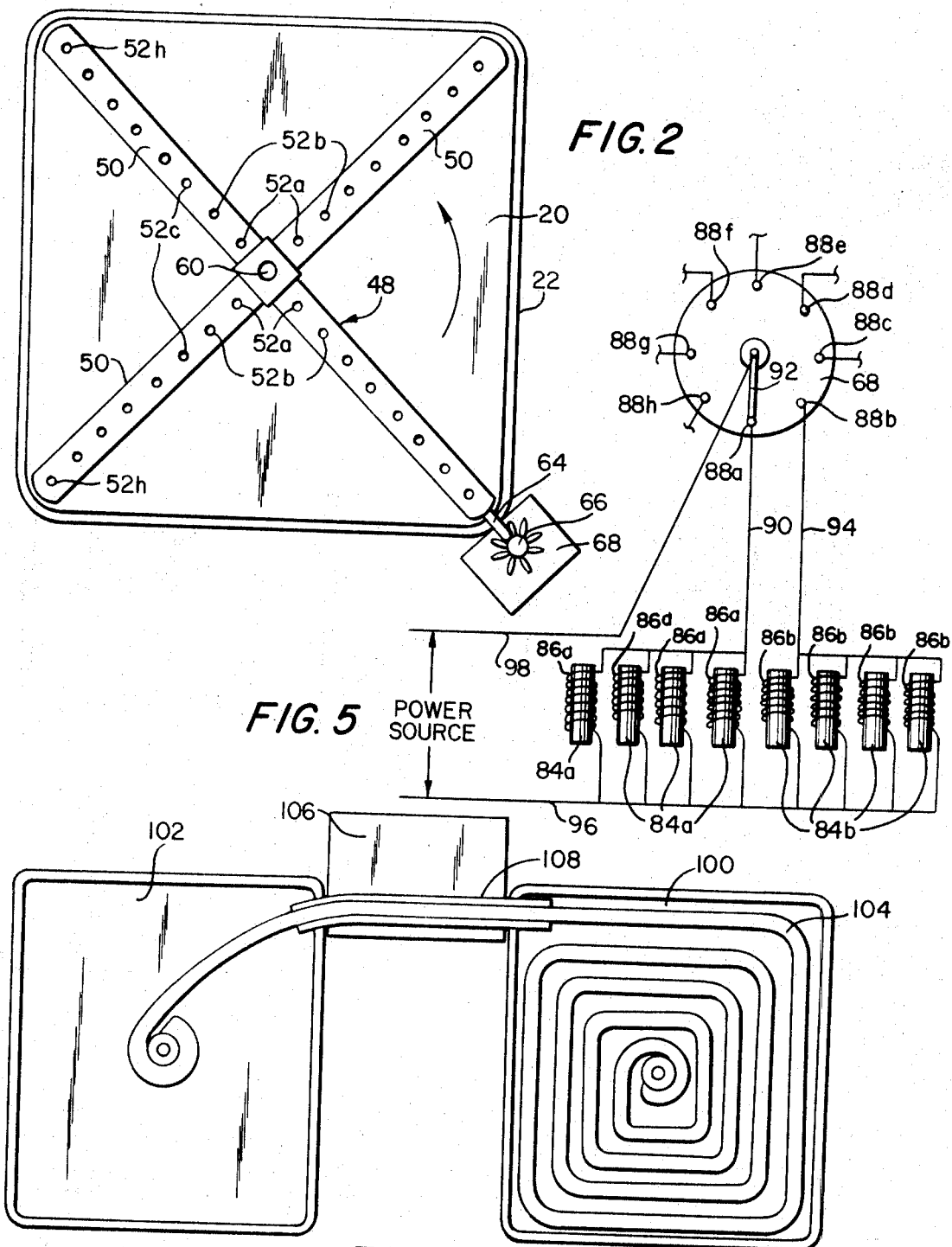

INVENTOR
PAUL R. EDWARDS

ATTORNEY

SQUARE PATTERN STRIP WINDING MEANS

BACKGROUND OF THE INVENTION

This invention relates to a machine for winding or unwinding strips of plant growth material or strips of such plant growth material containing seedlings or growing plants onto or off of a pallet spool. More particularly, the present invention relates to a machine for winding or unwinding strips of plant growth material or such strips of plant growth material containing seedlings or growing plants in a square pattern onto or off of a pallet spool from a shipping container or to a growing bench, and, still more particularly, for transferring such strips from one pallet spool to another.

In U. S. Pat. No. 3,543,438, issued to the present inventor, plant growing means are disclosed which comprise one or more bodies of plant growing material which may be compressed to substantially reduce the size thereof, thereby requiring less storage space and lower freight rates in shipping such materials. The bodies of such plant growing means are of porous construction whereby they can be watered without danger of overwatering since the sides will drain as well as the bottoms thereof. This porous construction also enables plants to grow rapidly when transplanted since the roots thereof can easily penetrate the porous walls of the body.

A plurality of bodies of plant growth material may be secured, in predetermined, spaced relationship, to a suitable connecting means or they may be made in the form of continuous strips or blocks connected by continuous support strips. The latter arrangement permits a plurality of bodies to be readily handled at one time, such as, when putting them on a growing bench in groups of 70 or more, thus, reducing the amount of time and effort involved. The construction, where the bodies are placed on a suitable connecting means, enables the bodies to be maintained in spaced relationship during shipping operations, the connecting means affording a convenient means for attaching the bodies in place within a shipping container. However, the preferred form of plant growing medium is a continuous strip which may be wound onto or unwound from a supporting pallet spool. Blocks of plant growth material on sheets of fabric or film as large as 18 inches by 24 inches are easily handled either by hand or various types of conveyors. However, narrow strips of one inch or two inches in width and two inches in depth, which may be as long as 700 feet, are difficult to handle whether they are being transferred from a production line to a shipping container, from a shipping container to a growing bench or from one pallet spool to another.

In order to overcome the difficulties of handling long narrow strips of plant growth material, copending application, Ser. No. 86,535, filed Nov. 3, 1970, now U.S. Pat. No. 3,703,050, by the present inventor, discloses a pallet spool which can be employed for supporting plant growth material or such plant growth material containing growing plants or seedlings. In accordance with the subject Application, such pallet spools comprise a central hub having means whereby a plurality of spools may be stacked, a substantially planar surface surrounding the hub and adapted to support the plant growth material and rim means surrounding the planar surface and of a height sufficient to retain the plant growth material on the planar surface. By utilizing such pallet spools, continuous strips of plant growth material may be wound onto and unwound from the pallet spool.

The pallet spools of the copending Application are designed for the winding of continuous strips of plant growth material in a circular pattern. However, such circular winding generally occupies only about 80 percent of the planar surface of the pallet spool. This low utilization of the surface area of the pallet spool will normally prohibit the use of this type of pallet spool in commerical operations. Accordingly, the present pallet spool winding machine is designed so that continuous strips of plant growth material can be wound thereon in a generally square pattern with the plantable side up. Such square pattern winding results in approximately 95 percent of the surface area of the pallet spool being utilized. The entire pallet spool can be moved by either a specially designed cart, a common forklift truck, a roller conveyor or manually by two or more workmen from one location to another.

SUMMARY OF THE INVENTION

The pallet spools of the present invention may be of circular construction as disclosed in copending application, Ser. No. 86,535, now U.S. Pat. No. 3,703,050. However, other designs, such as square patterns, are preferred in accordance with the present invention. In any event, the pallet spool is designed to be removably and rotatably mounted on an appropriate upstanding support leg. Also, rotatably mounted on the support leg beneath the pallet spool and supporting the pallet spool is a wheel. This wheel is driven or rotated by means of an electrical or hydraulic motor operatively coupled to a driving roller which is in contact with the lower side of the rotatable wheel. The motor is preferably a variable speed motor for reasons which will be pointed out hereinafter. The entire motor and driving roller assembly is supported on the support leg by means of a slidable collar. Attached to the slidable collar is a hydraulic jack means for lifting the driving mechanism into contact with the rotatable wheel and for adjusting the pressure of the driving roller against the rotatable wheel.

Removably mounted on the pallet spool assembly and rotatable therewith is a corner-forming means. The corner-forming means comprises a cruciform support means whose arms span the pallet spool and which is spaced above the planar surface of the pallet spool. Slidably mounted on the arms of the cruciform support are a plurality of minimum radius corner forms. These corner forms are spaced along the length of the arms of the cruciform support in a manner to form square patterns, of progressively larger size, of groups of four of the corner forms from complementary ones of the corner forms on each of the arms of the cruciform support. These corner forms are referred to as minimum radius corner forms to indicate that they are concave outwardly to provide the minimum radius around which the strip of plant growth material (depending on its width) can be wound without damage to the strip. The strip is bent sharply around these minimum radius corner forms so that the resulting pattern is nearly square rather than circular. In other words, with the strip making an essentially 90° turn at each corner around a very small radius, the strip is running parallel to the sides of the pallet the majority of the time. Each 360° turn of the pallet requires four corner forms. Thus, it is necessary that four such corner forms, representing one group, be lowered simultaneously toward the surface of the pallet spool and that each group of four be lowered sequentially beginning with the smallest square pattern and then progressing to larger and larger square patterns with each turn of the pallet spool. The number of sets of four corner forms will be dependent upon the number of turns required to fill the particular pallet spool. This, of course, depends upon the width of the strips and the size of the bench. By lowering one group of four each revolution of the pallet spool, the corner forms forming the larger square patterns will not interfere with the winding of the plant growth on the smaller corner forms. Each of the corner forms is connected to a spring-loaded shaft which biases the corner forms toward the pallet spool. The spring-loaded shafts are held in an upper, retracted position initially, compressing the spring, until they are released. The simultaneous lowering of the four corner forms, forming a square pattern, is accomplished by passing an electric current through a group of four electromagnets or solenoids, each of which releases a spring-loaded shaft and the corner forms. The first corner forms stay in position after the forms are lowered until the pallet makes a full revolution, whereupon, a second group of four corner forms forming a larger square pattern is simultaneously lowered. As the sets of four corner forms are sequentially lowered, they remain in their lowered position until the entire winding process has been completed. Thereafter, the spring-loaded lowering mechanism is recocked or reset by pulling on a ring to which all the shafts are connected by light chains or wires. In actual operation, the winding starts at the center, with the first turn being made around the hub of the pallet spool. At the beginning of the second turn, four corner forms of the first and smallest square pattern group are released and make close contact with the first turn of the strip of plant growth material. As the second turn is completed, the second set of minimum radius corner forms descends. This is repeated until the entire pallet is filled, at which time, the turning of the pallet is stopped. The corner forms are then retracted and their release mechanisms reset.

Thus, it is obvious from the above that continuous strips of plant growth material can be wound onto or unwound from the pallet spool automatically and with a minimum of manual labor or attention. However, the preferred arrangement comprises a system in which two such square pattern, strip winging machines are located adjacent one another for the transfer of strips of plant growth material from one pallet to another. This, of course, is necessary in order to transfer the strips of plant growth material from the production line to a shipping container or from a shipping container to a growing bench in a greenhouse or the like.

In this arrangement, a pallet having a continuous strip of plant growth material wound thereon, either in a square or circular pattern, is mounted on a support post having a suitable drive means as previously described. Adjacent this pallet spool assembly and spaced therefrom, a second pallet spool assembly is provided, wherein the support post has mounted thereon an empty pallet spool, a suitable drive means and a corner-forming mechanism all as previously described. The strip of plant growth medium is then unwound from the full pallet and onto the empty pallet. The corner-forming mechanism operates as previously described to wind the plant growth material onto the empty pallet in a square pattern. Mounted between the two pallet spools and offset slightly therefrom is a strip-guiding and motor speed regulating mechanism. This mechanism includes a long channel means of a width sufficient to accommodate the strip of plant growth material being transferred. A roller is mounted horizontally at each end of the channel along the bottom thereof to support the strip of plant growth material as it enters and leaves the channel. On both sides of each end of the channel, a pair of cylindrical rollers are mounted to apply proper tension to the strip of plant growth material and regulate the tightness of the wind of the receiving pallet spool. These rollers on either or both the receiving end or the discharge end of the channel have a tension adjusting means to adjust the pressure on the strip of plant growth material as it is being transferred from one pallet to another. The channel itself is also, preferably, flexible at each end to accommodate changes in the size of the winding pattern on the pallet from which the strip of plant growth material is being transferred and on the pallet onto which the strip of plant growth material is being wound. The channel is also provided with at least one means for varying the speed of the drive motors of the pallet assemblies, preferably around a curve in the guide channel. This speed adjusting means may consist of any number of means for adjusting the speed of either the receiving or the discharge pallet drive means. For example, pressure sensitive switches may be provided so that, if the strip does not enter the guide channel fast enough, the increased tension will depress one of the switches and cause the speed of the motor on the delivering pallet to increase or the speed of the motor on the receiving pallet to decrease. Where an electric motor is utilized to drive the pallets, speed control may be accomplished by placing a variable resistor in series with the armature of the motor or by placing a variable resistor in series with the field winding of the motor. The pressure sensitive switch may then take the form of a sliding contact of the variable resistor. It may also take the form of a sequential switch which switches contacts at a suitable resistor. Alternatively, the motors of the drive mechanisms may be hydraulic motors and the pressure sensitive switch can operate to adjust the output of a hydraulic pump, thus, varying the pressure of hydraulic fluid to a hydraulic motor.

The apparatus can also be provided with an automatic sequencing switch to operate the mechanism for sequentially lowering a group of four corner forms each time one revolution of the pallet occurs. In this instance, a suitable flange on the end of one arm of the cruciform strip guiding support will contact and rotate an operating knob connected to the arm of the rotary switch to thereby advance the switch one contact for each revolution of the pallet. Each contact of the rotary switch is connected to the complementary solenoids of the four corner forms forming a square pattern and supplies current to the solenoids to thereby release four of the corner forms simultaneously. On the next revolution of the pallet, the rotary switch will be switched to the next contact which will then supply current to four solenoids connected to the four corner forms forming the next larger square pattern.

BRIEF DESCRIPTION OF THE DRAWINGS

FIG. 1 is a side view, partially in section, of the winding machine of the invention;

FIG. 2 is a top view of the winding machine of the invention;

FIG. 3 is a bottom view of a section of one arm of the corner-forming means of the winding machine;

FIG. 4 is a side view, partially in section of the release mechanism for the corner-forming means of the winding machine;

FIG. 5 is an electrical schematic of the release mechanism for the corner-forming means of the winding machine;

FIG. 6 is a top view of an arrangement of winding machines for transferring a strip of material from one winding machine to another;

DESCRIPTION OF THE PREFERRED EMBODIMENTS

Figure 7:
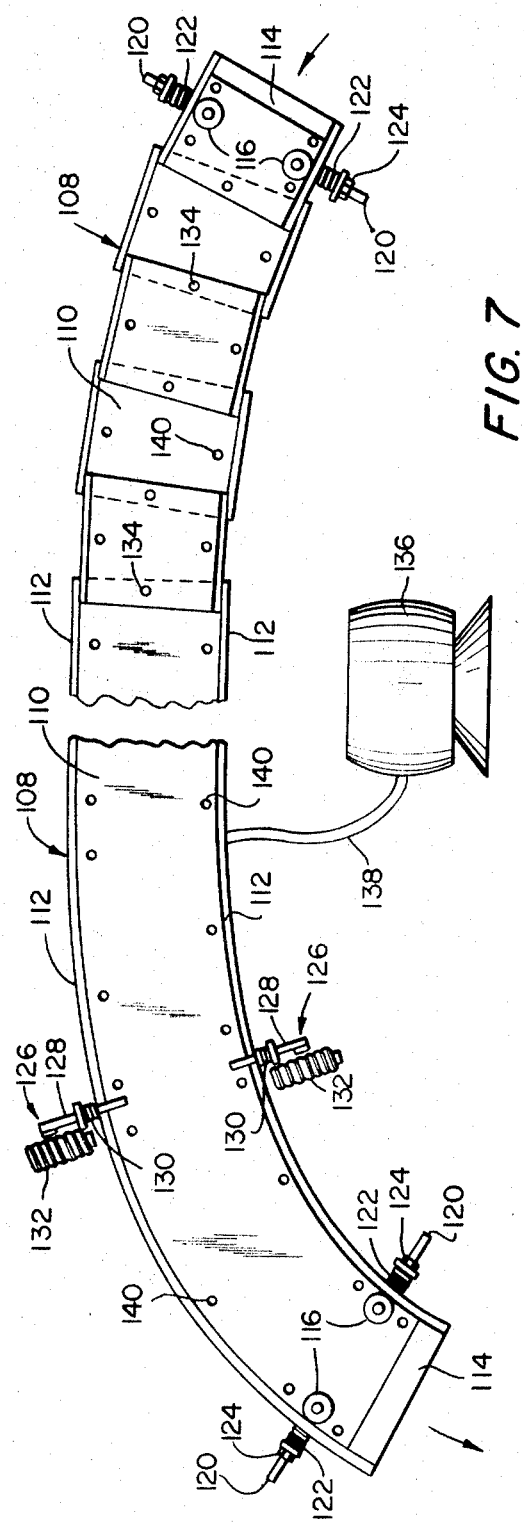
FIG. 7 is a top view of a guide means for the arrangement of winding machines of FIG. 6.

In accordance with the drawings, FIGS. 1 and 2 show the square pattern strip winding machine in detail, including the drive means and the corner-forming means. Specifically, as shown in FIG. 1, the entire machine is supported on cylindrical, support post 10. Rotatably mounted on support post 10 and resting on annular stop 12 is a wheel 14. Wheel 14 is attached to collar 16 by means of braces 18. Collar 16 is slidably mounted over support post 10 and is also capable of rotating about cylindrical support post 10. Also slidably mounted and rotatable on support post 10 and resting on drive wheel 14 is pallet spool 20. Pallet spool 20 is provided with upstanding border or edge 22 which surrounds the entire pallet and aids in retaining a wound strip of plant growth material on pallet 20. In frictional contact with wheel 20 is rotatable drive roller 24. Rotatable drive roller 24 is, in turn, operatively coupled to motor 26. Drive roller 24 and motor 26 are mounted on center post 10 through supports 28, 30 and 32 and slidable collar 34. Slidable collar 34 is keyed to support post 10 by means of key 36 which is fixedly attached to center post 10 and keyway 38 formed in slidable collar 34. Accordingly, drive roller and motor unit 24 – 26 will slide vertically on support post 10 but will not rotate thereon. In order to slide drive roller and motor unit 24 – 26 on support post 10, a suitable hydraulic or other jack 40 is mounted on support post 10 and rod 42 of jack 40 is attached to slidable collar 34 through flanges 44.

Mounted on the central hub 46 of pallet 20 is cruciform, corner-forming mechanism 48. Cruciform corner-forming mechanism 48 is composed of arms 50 which span pallet 20. Slidably mounted in arms 50 by means of rods 52 are corner forms 54. As will be detailed hereinafter in the discussion of FIG. 4 of the drawings, corner forms 54 and rods 52 are spring-loaded so as to normally urge the corner forms 54 toward pallet 20. However, rods 52 and corner forms 54 may be latched in their uppermost position and released as hereinafter detailed. In order to reset or latch rods 52, carrying corner forms 54, in the uppermost position after all of the rods and corner forms have been lowered and the pallet is fully wound, a plurality of chains 56 are attached to rods 52, and these chains are all attached to a ring means 58. Ring means 58 is slidable on post 60 which, in turn, is mounted on central hub 62 of the cruciform, corner-forming mechanism 48. In order to reset or latch the rods 52 and their attached corner forms 54 in the uppermost position, the operator simply pulls on ring 58 to simultaneously raise all of the rods 52 and corner forms 54 into their uppermost position. Thereafter, the ring 58 can slide downwardly to release the tension on the chains 56 and permit the downward release of the rods 52 and corner forms 54.

As shown in FIG. 2 of the drawings, the cruciform corner-forming mechanism 48 is made up of four arms 50 which span pallet 20 from corner to corner. Pallet 20 could, of course, be a round pallet, but an essentially square pallet, as shown in FIG. 2, is preferred both because of its greater ease of handling and the greater utilization of space when a strip of plant growth material is wound on the pallet in a square pattern. As previously indicated, corner forms 54 are released in groups of four so that the corner forms will then form a square pattern on the pallet about which the strip of plant growth material may be wound. Consequently, rods 52a will be released first. Thereafter, each group of corner forms forming the next larger square pattern will sequentially be released. Consequently, after rods 52a are released, as shown in FIG. 2, rods 52b will be released, then 52c, etc. In order to sequentially release each group of four rods and corner forms, a flange 64 protrudes from the end of one of arms 50. Flange 64 operatively engages the operating knob 66 of rotary switch 68. Accordingly, each time cruciform, corner-forming mechanism 48 makes one complete revolution, it will contact operating knob 66 of rotary switch 68 advancing the rotary switch one contact and releasing the next group of four corner forms.

FIG. 3 of the drawings shows an enlarged view of the corner forms 54. As previously indicated, corner forms 54 are convex outwardly and have a radius such that a strip of plant growth material may be wound about the corner form as tightly as possible and on minimum possble radius without damage to the strip of plant growth material.

FIG. 4 of the drawings shows, in detail, the method of latching and releasing rods 52 with corner forms 54 attached thereto. Rod 52 and corner form 54 are formed as an integral unit and are joined by collar 70. Mounted between a stop 72 formed in arm 50 and collar 70 is spring 74. Spring 74 is compressed when corner forms 54 are in their uppermost position and thus, corner forms 54 are spring-biased downwardly toward the pallet by means of spring 74. Pivotally mounted in arm 50 by means of pivot 76 is latch 78. Latch 78 is spring-loaded to bias the latch toward collar 70 and to therefore normally hold the latch under collar 70. FOrmed on latch 78 is contact 82. Contact 82 is operatively associated with an electromagnetic coil comprising core 84 and coil 86. Consequently, in operation, when coil 86 is energizd to thereby energize the electromagnet, core 84 will pull contact 82 and latch 78 toward core 84, thus overcoming the bias of spring 80 and releasing rod 52 and corner form 54. Subsequently, when the current to coil 86 is interrupted, rod 52 and corner form 54 will be in the downward position because of the biasing spring 74 and will be held in this position until the mechanism is relatched or reset. Also, when the current to coil 86 was discontinued, latch 78 was returned to the latching position by spring 80. In order to reset the mechanism, chain 56 is pulled upwardly to thereby pull rod 52 and corner form 54 to an uppermost position, whereby collar 70 will momentarily depress latch 78 until the collar is above latch 78. Latch 78 then returns to its normal, latching position holding rod 52 and corner form 54 in their uppermost position.

As previously indicated, four complementary corner forms, such as 54a and 54b, respectively, will be released simultaneously. Such release is accomplished as shown in FIG. 5 of the drawings. In FIG. 5 of the drawings, cores 84a and 84b of the electromagnets are associated with corner forms 54a and 54b, respectively. In order to release four of these simultaneously, a group of four, such as 84a, are electrically connected to contact 88a of rotary switch 68 through line 90. Thus, when rotary switch 68 has its contact arm 92 in contact with contact element 88a, coils 86a of the four electromagnets will be simultaneously energized. This, in turn, will unlatch the rod and corner form units 52a – 54a on all of the four arms of support 50. As the cruciform, corner-forming mechanism 48 makes a complete revolution and flange 64 contacts operating knob 66 of rotary switch 68, the switch will be stepped one step to place the arm 92 in contact with contact element 88b of rotary switch 68. Contact element 88b is electrically connected to coils 86b, associated with rod and corner form units 52b – 54b of the corner-forming mechanism, through line 94. When coils 86b are thus energized, rods 52b and corner forms 54b will be unlatched, and this group of corner forms will be lowered. Thus, each set of four corner forms will be sequentially released as the cruciform, corner-forming mechanism makes one revolution and these corner forms will be released in sequence such that the smallest group is released first and thereafter, the next larger group is released. The opposite ends of coils 86 are, of course, connected to a suitable source of current through line 96 and the operating arm of rotary switch 68 is connected to the source of current through line 98.

As previously indicated, in order to transfer the strip of plant growth material from one pallet spool to another, it is of course, necessary that two winding machines be utilized. This is illustrated by FIG. 6 of the drawings. In accordance with FIG. 6, two pallet spools 100 and 102 are placed side by side. Pallet spool 100 is, of course, the full pallet spool from which the strip of plant growth material 104 is to be transferred to empty pallet spool 102. In FIG. 6, the spacing of the windings of plant growth material are slightly exaggerated for illustrative purposes in order to illustrate a square pattern winding arrangement. Obviously, as a strip of plant growth material is being transferred from pallet spool 100 to pallet spool 102, some means must be provided guiding the strip as it passes between the two pallet spools and for regulating the speed of rotation of the two pallet spools to accommodate the difference in size of the wound strips on each pallet spool and other variations in speed in the passage of the strip from one spool to the other. Therefore, it is necessary that a strip guiding and motor speed regulating mechanism 106 be utilized. The strip guiding and motor speed regulating mechanism 106 is positioned between and slightly offset from pallet spools 100 and 102. Included as a major component of the transfer unit is a strip guiding means 108.

As illustrated in FIG. 7, strip guiding means 108 is made up of a channel, which is of a width sufficient to accommodate the strips being transferred. Channel 108 is composed of a straight center section and flexible end sections. channel 108 is provided with a bottom section 110 and upstanding sides 112. Mounted on each end of channel 108 is a horizontally-disposed roller 114. Rollers 114 merely support the strip as it enters and exits from the channel. Also adjacent the ends of channel 108 are a pair of vertically-disposed rollers 116, which are placed on each side of the entrance and exit to the guide channel. The pair of vertical rollers 116 at the discharge end of guide channel 108 provide proper tension on the strip of plant growth material to regulate the tightness of the wind on the receiving pallet. For this purpose, rollers 116 are mounted through the walls of channel 108 by means of a pair of rods 120. Rods 120 are provided with a spring 122 and adjusting nut 124. Rollers 116 on the receiving end of guide channel 108 are also provided with means for adjusting the tension on the strip and serve to adjust the pressure applied by the strip of plant growth material on pressure sensitive switches 126 as the strip passes between the pressure sensitive switches. As illustrated in FIG. 7, these pressure sensitive switches are mounted on one or both sides of the channel, preferably where the strips of plant growth material pass around a curve in the channel. As illustrated in FIG. 7, pressure sensitive switches 126 comprise a variable resistor with a sliding contact. The arm 128 of the sliding contact resistor passes through the side of channel 108. If a strip does not enter the guide channel fast enough, increased tension will depress one of the switches around the corner and cause the motor driving the delivering pallet spool to increase or the speed of the motor driving the receiving pallet to decrease. The sliding arm 128 of the variable resistor is spring-loaded by means of spring 130 to return the arm to its normal position. The sliding contact, of course, is in contact with an elongated, linear resistance coil 132. These pressure sensitive switches or regulators can also be mounted around the curve in the entrance end of guide channel 108 but are not shown in the Figure in order to simplify the drawing and illlustrate the means of making the ends of the channel flexible. In order to permit the channel to flex and form a different curve as required by changes in the size of the winding of strip material on a given pallet spool, the ends of channel 108 are flexible to a certain extent. This may be accomplished by having a plurality of sections which are overlapping and, in essence, telescope and which are pivoted or joined together by bottom pins 134 as illustrated at the entrance end of the channel to the right of FIG. 7. A similar construction which permits flexing of the discharge end of the channel is utilized but is not shown in order to simplify the drawing.

In order to protect the foliage of plants planted in the strip of plant growth material, it is necessary to prevent the foliage of these plants from becoming wound between strips of plant growth material on the pallet spool or on the rollers of the guide means or from being damaged by the speed regulating mechanism. Accordingly, channel 108 is provided with a small blower 136 which is connected to a manifold beneath the channel (not shown) by means of air line 138. In order to deliver air below the leaves and lift the leaves of the plants, air outlets or nozzles 140 are mounted along the channel. By thus delivering air upwardly from the bottom of the channel and along the sides, the leaves will be lifted upwardly and held upwardly as they pass through the channel mechanism.

Control of the speed of the drive motors of the pallet-turning mechanism may be effected in several ways. As illustrated in FIG. 7, this can be accomplished by means of a sliding contact, variable resistor.

Figure 8:
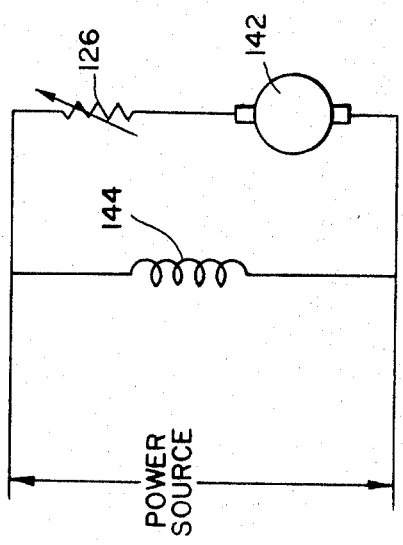
FIG. 8 is an electrical schematic of one means for varying the speed of the drive means of the winding machine.

FIG. 8 of the drawings illustrates one technique for controlling an electrical motor wherein variable resistor 126 is placed in series with the armature 142 of the motor. The field coil of the motor is indicated by numeral 144.

Figure 9:
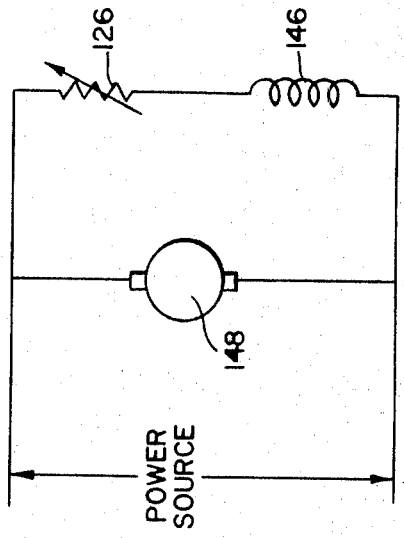
FIG. 9 is an electrical schematic of an alternate means for varying the speed of the drive means of the winding machine.

As an alternative, FIG. 9 shows speed control of an electrical motor by placing variable resistor 126 in series with the field coil 146 of the motor. In FIG. 9, the armature of the motor is indicated by numeral 148.

Other means of adjusting an electrical motor may also be provided or, as previously indicated, the motor can be a hydraulic motor. In this instance, the pressure sensitive switch or a variable resistor, as shown in FIG. 7, can be electrically connected to the pump of the hydraulic system, thereby varying the pressure of hydraulic fluid to the hydraulic motor.

It will be obvious to those skilled in the art that many modifications may be made within the scope of the present invention without departing from the spirit thereof, and the invention includes all such modifications.

What is claimed is:

1. A winding machine for winding strips of plant growth material on a pallet; comprising, rotatable pallet means; corner forming means, including, cruciform support means removably mounted on said pallet means to rotate therewith, having arms spanning said pallet means and spaced above said pallet means, a plurality of corner form means slidably mounted on said support means and spaced along each arm of said support means to form square patterns, of progressively larger size, of groups of four of said form means from complementary ones of said form means on each of said arms of said support means, and means for sliding each of said form means toward said pallet means; and drive means for rotating said pallet means and said support means.

2. A machine in accordance with claim 1 in which the corner form means are each convex outwardly and have a minimum radius about which the plant growth strips can be turned without damage to said strips.

3. A machine in accordance with claim 1 wherein the means for sliding each of the form means toward the pallet means is a spring which biases said form means toward said pallet means.

4. A machine in accordance with claim 3 wherein the corner-forming means additionally includes latching means for holding the form means in a retracted position against the bias of the spring.

5. A machine in accordance with claim 4 wherein the latching means includes an electromagnet.

6. A machine in accordance with claim 1 wherein the means for sliding each group of four of the form means toward the pallet means includes means for sliding all four of each group of form means toward said pallet means simultaneously.

7. A machine in accordance with claim 1 wherein the corner-forming means includes means for sliding each group of four form means which form successively larger square patterns toward said pallet means sequentially.

8. A machine in accordance with claim 1 wherein the drive means for rotating the pallet and the support means is a variable speed device.

9. A machine in accordance with claim 1 wherein the drive means for rotating the pallet means and the support means includes a rotatable wheel having one side thereof in contact with the pallet means, a friction roller means in contact with the opposite side of said rotatable wheel and a motor operatively coupled to said friction roller means.

10. A machine in accordance with claim 9 wherein the motor is a variable speed motor.

11. A machine in accordance with claim 9 wherein the drive means for rotating the pallet means and the support means additionally includes hydraulic jack means for moving the drive means toward and away from the rotatable wheel.

12. A machine in accordance with claim 1 which additionally includes a second winding machine, having rotatable pallet means, and drive means for rotating said pallet means, positioned adjacent the first winding machine and a strip guide means for guiding the strip of plant growth material as it passes from one of said winding machines to the other is positioned adjacent the winding machines.

13. A machine in accordance with claim 12 wherein the guide means additionally includes means for regulating the speed of at least one of the drive means for rotating the pallet means of the winding machines.

14. A machine in accordance with claim 13 wherein the means for regulating the speed of the drive means includes pressure sensitive switch means mounted along the internal walls of the guide means.

15. A machine in accordance with claim 14 wherein the switch means are mounted adjacent one or more bends in the guide means.

16. A machine in accordance with claim 12 wherein at least one end of the guide means is flexible.

17. A machine in accordance with claim 12 wherein the guide means includes horizontally-disposed rollers at each end of said guide means.

18. A machine in accordance with claim 12 wherein the guide means includes a pair of vertically-disposed rollers on each side of the guide means adjacent both ends of the guide means.

19. A machine in accordance with claim 18 wherein the vertically-disposed rollers include means for varying the inward and outward pressure of the rollers.

20. A machine in accordance with claim 12 wherein the guide means includes foliage protective means for preventing the foliage of plants mounted in the strip of plant growth material from being damaged.

21. A machine in accordance with claim 20 wherein the foliage protective means is an air blower means.

* * * * *